(12) United States Patent
Tack et al.

(10) Patent No.: US 11,095,835 B2
(45) Date of Patent: Aug. 17, 2021

(54) USE OF SPECTRAL LEAKS TO OBTAIN HIGH SPATIAL RESOLUTION INFORMATION FOR HYPERSPECTRAL IMAGING

(71) Applicant: IMEC VZW, Leuven (BE)

(72) Inventors: Nicolaas Tack, Buggenhout (BE); Andy Lambrechts, Herent (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 16/722,877

(22) Filed: Dec. 20, 2019

(65) Prior Publication Data
US 2020/0204745 A1 Jun. 25, 2020

(30) Foreign Application Priority Data
Dec. 21, 2018 (EP) .................................. 18215222

(51) Int. Cl.
*H04N 5/33* (2006.01)
*G02B 5/28* (2006.01)
(Continued)

(52) U.S. Cl.
CPC ............ *H04N 5/332* (2013.01); *G02B 5/281* (2013.01); *G02B 5/283* (2013.01); *G02B 5/284* (2013.01); *H04N 5/357* (2013.01); *H04N 5/374* (2013.01)

(58) Field of Classification Search
CPC ......... G01J 2003/106; G01J 2003/1247; G01J 2003/2826; G01J 3/10; G01J 3/26;
(Continued)

(56) References Cited

U.S. PATENT DOCUMENTS

2006/0007547 A1 1/2006 Kamikawa
2007/0153542 A1 7/2007 Gono et al.
(Continued)

FOREIGN PATENT DOCUMENTS

| JP | 2010-020120 A | 1/2010 | |
| WO | 2007/018616 A1 | 2/2007 | |
| WO | WO-2013047627 A1 * | 4/2013 | ................ G01J 3/32 |

OTHER PUBLICATIONS

Lambrechts et al. "A CMOS-compatible, integrated approach to hyper- and multispectral imaging" 2014 IEEE, 4 pages. (Year: 2014).*

(Continued)

*Primary Examiner* — Nathnael Aynalem
(74) *Attorney, Agent, or Firm* — McDonnell Boehnen Hulbert & Berghoff LLP

(57) ABSTRACT

An example method and hyperspectral imaging (HSI) system for imaging a scene are provided. The method is for imaging the scene with the HSI system including a sensor with a plurality of sensor pixels and a plurality of spectral filters, each of the spectral filters being associated with one of the sensor pixels. The method comprises obtaining a higher-resolution spatial image by illuminating the scene with a first set of wavelengths, wherein each spectral filter passes the first set of wavelengths to the sensor pixel it is associated with. The method further comprises obtaining a lower-resolution hyperspectral image by illuminating the scene with a second set of wavelengths, wherein each spectral filter passes only a subset of the second set of wavelengths to the sensor pixel it is associated with.

19 Claims, 6 Drawing Sheets

(51) Int. Cl.
*H04N 5/357* (2011.01)
*H04N 5/374* (2011.01)

(58) Field of Classification Search
CPC ...... G01J 3/2823; G01J 2003/102; G01J 3/08;
G02B 5/281; G02B 5/283; G02B 5/284;
H04N 5/332; H04N 5/374; H04N 5/357;
G06T 2207/10036; G06K 2009/00644
USPC ..................................... 348/77, 164; 382/91
See application file for complete search history.

(56) References Cited

U.S. PATENT DOCUMENTS

| | | | |
|---|---|---|---|
| 2011/0270092 A1* | 11/2011 | Kang | .................... G01J 3/2823 600/476 |
| 2014/0160253 A1 | 6/2014 | Backman et al. | |
| 2015/0015692 A1 | 1/2015 | Smart | |
| 2015/0044098 A1 | 2/2015 | Smart et al. | |

OTHER PUBLICATIONS

European Search Report, European Patent Application No. 18215222.3, dated Jul. 10, 2019, 9 pages.

\* cited by examiner

20

21 — Obtain a higher-resolution spatial image by illuminating a scene with a first set of wavelengths, wherein each of multiple spectral filters associated with one of multiple sensor pixels passes the first set of wavelengths to the sensor pixel it is associated with.

22 — Obtain a lower-resolution hyperspectral image by illuminating the scene with a second set of wavelengths, wherein each spectral filter passes only a subset of the second set of wavelengths to the sensor pixel it is associated with.

FIG. 2

USE OF SPECTRAL LEAKS TO OBTAIN HIGH SPATIAL RESOLUTION INFORMATION FOR HYPERSPECTRAL IMAGING

CROSS-REFERENCE TO RELATED APPLICATION

The present application is a non-provisional patent application claiming priority to European Patent Application No. 18215222.3 filed Dec. 21, 2018, the contents of which are hereby incorporated by reference.

TECHNICAL FIELD

The present disclosure relates to the field of Hyperspectral Imaging (HSI). In particular, the disclosure proposes a method and an HSI system usable for spectral imaging of a scene. Thereby, the method and system are configured to make use of spectral leaks of spectral filters used in the HSI system, in order to obtain high spatial resolution information and use it, for instance, for positioning and aligning the HSI system for further HSI.

BACKGROUND

An HSI system can include an illumination source and a hyperspectral camera. A hyperspectral camera is a device capable of capturing the spectrum of each single pixel of a scene. In an example design of a hyperspectral camera, a spectral unit is integrated on top of a standard, off-the-shelf, Complementary Metal-Oxide-Semiconductor (CMOS) image sensor. The use of CMOS process technology heavily reduces the cost and improves the compactness of the hyperspectral camera.

The spectral unit on top of the CMOS sensor includes a plurality of spectral filters, each having a well-defined spectral transmission. Spectral filters with very narrow bandwidths can thereby be used. For example, an interference filter (e.g. Fabry-Pérot filter) may be monolithically integrated directly on top of each individual sensor pixel of the CMOS sensor. By properly designing the interference filters, the wavelength band detected by each individual sensor pixel can be selected and controlled.

Different spectral filter arrangements may be employed to retrieve spectral information of a scene. One example is the mosaic arrangement configuration, which uses groups of sensor pixels each covered by a filter bank including different spectral filters, in order to create a plurality of macro-pixels and to get the spectral information of the scene per macro-pixel. This approach provides accurate spectral information of the scene, but it sacrifices spatial resolution, because multiple sensor pixels are needed to create a macro-pixel.

However, some application scenarios can involve obtaining an image of the scene with as high as possible spatial resolution, in order to accurately focus on the scene, align the hyperspectral camera, and/or identify specific objects in the scene. Depending on the application scenario, an object of interest can be a complete region covered by a specific material, a multitude of items dispersed over different parts of the scene, or individual items in the scene.

For example in a medical application scenario, specifically the analysis of wounds, it is important to first identify whether the wound is properly imaged, before a hyperspectral image is obtained. Another application scenario is the study of a material composition, wherein it should first be ensured that the region of interest is covered by the hyperspectral camera and in focus. Another example is an ophthalmologic applications scenario, in which it is highly beneficial to get a high spatial resolution image of the eye first, and then use this spatial information to properly align and focus the hyperspectral camera, e.g. on the retina.

Currently, however, no HSI system exists that is able to obtain the spectral information of a scene and also the spatial content of the scene with highest possible resolution.

SUMMARY

In view of the above-mentioned disadvantages, embodiments of the present disclosure aim to improve the above-described HSI systems and methods. Described herein are a method and an HSI system, with which not only the spectral information of a scene can be obtained, but also the spatial content of the scene with highest possible resolution. A particular challenge is to achieve this with a comparatively cheap and simple HSI system.

The embodiments of the present disclosure are based on an HSI system as described above.

CMOS sensors can have a broad spectral response, as shown in FIG. 4, for example. The spectral response of a CMOS sensor can cover the full visible region and also parts of the near-infrared (NIR) and ultraviolet (UV) regions.

However, the spectral filters of the HSI system can suffer from transmission of wavelengths outside of their nominal spectral range. These broadband wavelength regions are denominated in this application as "spectral leaks" or "spectral-leak wavelengths." The origin of these out-of-band transmissions can come from leakage in mirrors used for Fabry-Pérot filters or other interference filters such as multi-cavity filters as the spectral filters. FIG. 5 shows in this respect example spectral responses of different spectral (interference) filters, wherein both the main transmissions and the spectral leakages of broadband wavelengths regions can be observed.

Furthermore, the spectral (interference) filters also transmit wavelengths corresponding to higher interference orders, which is illustrated in FIG. 6. In particular, FIG. 6 shows an example spectral response of an interference filter. The main order harmonic and a second order harmonic along with the spectral leaks are illustrated.

Broadband rejection filters can be added to the HSI system in order to remove the transmission caused by higher order interference and the spectral leak transmissions. These rejection filters can be integrated on top of the spectral filters, e.g. placed on a separate glass plate covering the camera sensor pixels, or can be integrated with some components of the imaging optics of the hyperspectral camera, like the imaging lenses. However, the use of rejection filters increases the complexity and cost of the HSI systems.

An HSI system and method proposed according to embodiments of the present disclosure make use of the normally undesired spectral leaks, in order to create an image with high spatial resolution.

The HSI system and method therefore do not use rejection filters arranged in front of the sensor, which can be otherwise used to prevent the spectral leaks transmissions to reach the sensor. Further, the spectral emission of the illumination source of the HSI system is made tunable, such that it can either emit only in the spectral leaks region, or only in the region where the interference filters act (at their desired bandwidths). The scene is accordingly first illuminated in the spectral leaks region and a plurality of or all sensor pixels of the sensor are used as individual image pixels to create an image with a higher spatial resolution. Then, the scene is illuminated in the spectral region where the spectral filters nominally work, in order to obtain the spectral information of the scene with a lower resolution.

In particular, a first aspect of the disclosure provides a method for imaging a scene with an HSI system including a sensor with a plurality of sensor pixels and a plurality of spectral filters, each of the spectral filters being associated with one of the sensor pixels, wherein the method comprises: obtaining a higher-resolution spatial image by illuminating the scene with a first set of wavelengths, wherein each spectral filter passes the first set of wavelengths to the sensor pixel it is associated with, and obtaining a lower-resolution hyperspectral image by illuminating the scene with a second set of wavelengths, wherein each spectral filter passes only a subset of the second set of wavelengths to the sensor pixel it is associated with.

With the method of the first aspect, it is possible to obtain the spectral information of the scene (captured in the lower-resolution hyperspectral image) and also to obtain the spatial content of the scene with high resolution (captured in the higher-resolution spatial image). In particular, this can be achieved with a cheap and relatively simple HSI system. The method of the first aspect thus makes new application scenarios feasible for HSI, for example, ophthalmologic or medical applications. The method also allows for obtaining improved hyperspectral images, due to the higher-resolution spatial information available.

The illumination with the first set of wavelengths may occur before, after, or at the same time as the illumination with the second set of wavelengths. If the illumination with the two sets of wavelengths happens at the same time, a filter can be provided before the sensor, in order to allow only one of the first set of wavelengths and the second set of wavelengths to reach the sensor at a time.

In an example embodiment of the method, the first set of wavelengths includes common spectral-leak wavelengths of the spectral filters.

Thus, each sensor pixel associated with its spectral filter can capture at least a part of the first set of wavelengths, and thus act as an image pixel. Notably, the first set of wavelengths can be a broadband region. Thus, a lower quantum efficiency (QE) of the spectral leaks region (compare e.g. FIG. 6) may be compensated for by illuminating the scene in the full broadband of the spectral leaks.

In an example embodiment of the method, each of the spectral filters passes a different subset of the second set of wavelengths to the sensor pixel it is associated with.

In this case, the plurality of pixels forms a macro-pixel (or sensing unit) of the HSI sensor. The HSI sensor may have multiple such macro-pixels, e.g. multiple identical macro-pixels. Each macro-pixel may thus include the same spectral filters, i.e. spectral filters with different narrow pass-bands but with common spectral-leak wavelengths.

The spectral information of the scene is finally gathered in the hyperspectral image. The hyperspectral image may be a 3D data cube (hyperspectral cube) that includes a plurality of 2D images, wherein each image is acquired at a different narrow spectral band. In other words, for each point in an imaged 2D area, multiple monochromatic images, sensitive to different wavelengths, are acquired. For instance, each macro-pixel may represent one point in the imaged 2D area, and one monochromatic image may be produced for each one of the spectral filters, which are associated with the various sensor pixels of that macro-pixel.

In an example embodiment, the method comprises using the obtained higher-resolution spatial image to focus on the scene and/or align the HSI system with respect to the scene and/or identify an object in the scene, before obtaining the lower-resolution hyperspectral image. In this way, the hyperspectral image quality can be improved, and HSI of the scene becomes easier and more reliable.

In an example embodiment of the method, the higher-resolution spatial image is obtained by using each of the sensor pixels as a different pixel of the image.

In an example embodiment of the method, the lower-resolution hyperspectral image is obtained by using different groups of the sensor pixels as different macro-pixels of the image.

As already explained above, for each of the macro-pixels, a plurality of narrowband spectral images may be obtained, one for each spectral filter associated with the sensor pixels of this macro-pixel.

In an example embodiment of the method, the first set of wavelengths includes near-infrared (NIR), ultraviolet (UV), and/or violet wavelengths.

Since these are wavelengths that are not visible to the human eye, ophthalmologic application scenarios are supported. For instance, a higher-resolution spatial image of the eye can be obtained without disturbing the eye, i.e. the pupil does not close because the eye does not detect the NIR or UV radiation. Thus, the HSI system can be correctly focused and/or aligned, and then a lower-resolution hyperspectral image of the eye, e.g. of the retina, can be obtained.

In an example embodiment of the method, the first set of wavelengths includes more wavelengths than the second set of wavelengths and/or covers a broader wavelength range than the second set of wavelengths. Thus, a lower QE of the spectral leaks region is compensated by a broadband illumination.

In an example embodiment of the method, a duration of illuminating with the first set of wavelengths is longer than a duration of illuminating with the second set of wavelengths. This provides a further measure to compensate for the lower QE in the spectral leaks region.

In an example embodiment of the method, the sensor includes a plurality of further sensor pixels and the HSI system includes a plurality of further spectral filters, each of the further spectral filters being associated with one of the further sensor pixels, wherein the method comprises: obtaining the higher-resolution spatial image by illuminating the scene with the first set of wavelengths and illuminating the scene with a third set of wavelengths, wherein each further spectral filter passes the third set of wavelengths to the further sensor pixels it is associated with, and obtaining the lower-resolution hyperspectral image by illuminating the scene with the second set of wavelengths, wherein each further spectral filter passes only a subset of the second set of wavelengths to the further sensor pixels it is associated with.

Thus, the method is also compatible with more complex sensor geometries, e.g. geometries in which different types of macro-pixels (or sensing units) are used. Each macro-pixel may be formed by a block (or array) of sensor pixels. Different blocks of sensor pixels may be covered by different filter banks (or filter arrays), wherein each filter bank includes a plurality of spectral filters. Thereby, the spectral filters of different filter banks may have different common spectral-leak wavelengths. More complex sensor geometries include, for instance, mosaic configurations of the HSI sensor.

The illumination with the third set of wavelengths may occur before, after, or at the same time as the illumination with the first and/or second set of wavelengths. If the illumination with the third set of wavelengths happens at the same time as with another set of wavelengths, a filter can be provided before the sensor, in order to allow only one of the sets of wavelengths to reach the sensor at a time.

A second aspect of the present disclosure provides an HSI system for imaging a scene, the HSI system comprising: a sensor including a plurality of sensor pixels, a plurality of spectral filters, each of the spectral filters being associated with one of the sensor pixels, and an illumination source configured to illuminate the scene at least with a first set of wavelengths and with a second set of wavelengths, wherein each spectral filter is configured to pass the first set of wavelengths to the sensor pixel it is associated with and to pass only a subset of the second set of wavelengths to the sensor pixel it is associated with.

For example, the at least one illumination source may first emit the first set of wavelengths to illuminate the scene, and may subsequently/separately emit the second set of wavelengths to illuminate the scene. In particular, a first illumination source may thereby illuminate the scene with the first set of wavelengths, and a second illumination source may illuminate the scene with the second set of wavelengths.

In an example embodiment, the HSI system is configured to obtain a higher-resolution spatial image of the scene by illuminating the scene with the first set of wavelengths and capturing the spatial image using each of the sensor pixels as a different pixel of the image, and obtain a lower-resolution hyperspectral image of the scene by illuminating the scene with the second set of wavelengths and capturing the hyperspectral image using different groups of the sensor pixels as different macro-pixels of the image.

In an example embodiment, the HSI system further comprises one or more rejection filters, each rejection filter being associated with one or more of the spectral filters, wherein each rejection filter is configured to block wavelengths corresponding to higher interference orders of the subsets of the second set of wavelengths, which the spectral filters it is associated with are configured to pass.

In an example embodiment of the HSI system, the illumination source includes a plurality of filters and is configured to produce the first set of wavelengths using at least a first filter, and to produce the second set of wavelengths using at least a second filter.

In an example embodiment of the HSI system, the illumination source includes one or more first light sources, such as first light emitting diodes (LEDs), configured to produce the first set of wavelengths, and includes one or more second light sources, such as second LEDs, configured to produce the second set of wavelengths.

In an example embodiment of the HSI system, the illumination source is configured to illuminate the scene at the same time with the first set of wavelengths and the second set of wavelengths, and the HSI system further includes at least one filter configured to separately pass the first set of wavelengths before or after the second set of wavelengths to the sensor.

Accordingly, it is also possible to use at least one illumination source that emits at the same time the first set of wavelengths and the second set of wavelengths to illuminate the scene. That is, the illumination source illuminates the scene with the full wavelength range including the bandwidths of the spectral filters and the spectral-leak wavelengths. In this case, the at least one filter, e.g. a variable filter like a filter wheel (or a plurality of interchangeable filters), may be applied in front of the sensor, in order to switch from one set of wavelengths to the other. For example, in a first setting/position the variable filter may allow only the first set of wavelengths to reach the sensor (while the second set of wavelengths is filtered out), and in a second setting/position the variable filter may allow only the second set of wavelengths to reach the sensor (while the first set of wavelengths is filtered out). The settings/positions can be set before or after another, while the scene is illuminated with the full wavelength range.

With the HSI system of the second aspect, all the advantages and effects described above for the method of the first aspect can be achieved. The HSI system is adapted particularly to carry out the method of the first aspect. The adaptions relate, for instance, to the illumination source, which is tailored to the spectral leaks regions of the spectral filters, and to the omission of broadband rejection filters, which would prevent the spectral-leaks wavelengths to reach the sensor.

In summary, the method and HSI system according to embodiments (aspects and implementation forms) of the present disclosure provide flexibility in the construction of the HSI system by transferring to the illumination source the selection of the desired wavelengths. Further, advantage is taken of the sensitivity of the sensor in the spectral leaks regions, which are normally not used, like NIR.

The embodiments described herein are useful for applications in which the spatial information is only used for a preliminary alignment. They are also useful for applications in which the spatial information is used to focus on a specific plane of the scene, even if later the scene moves at a fast speed, as long as the object of interest remains in the same plane of the scene and a lower spatial resolution of the object is sufficient.

BRIEF DESCRIPTION OF THE DRAWINGS

The above described aspects and implementations are explained in the following description of embodiments with respect to the enclosed drawings:

FIG. 2 shows a method according to an example embodiment.

DETAILED DESCRIPTION

Figure 1:
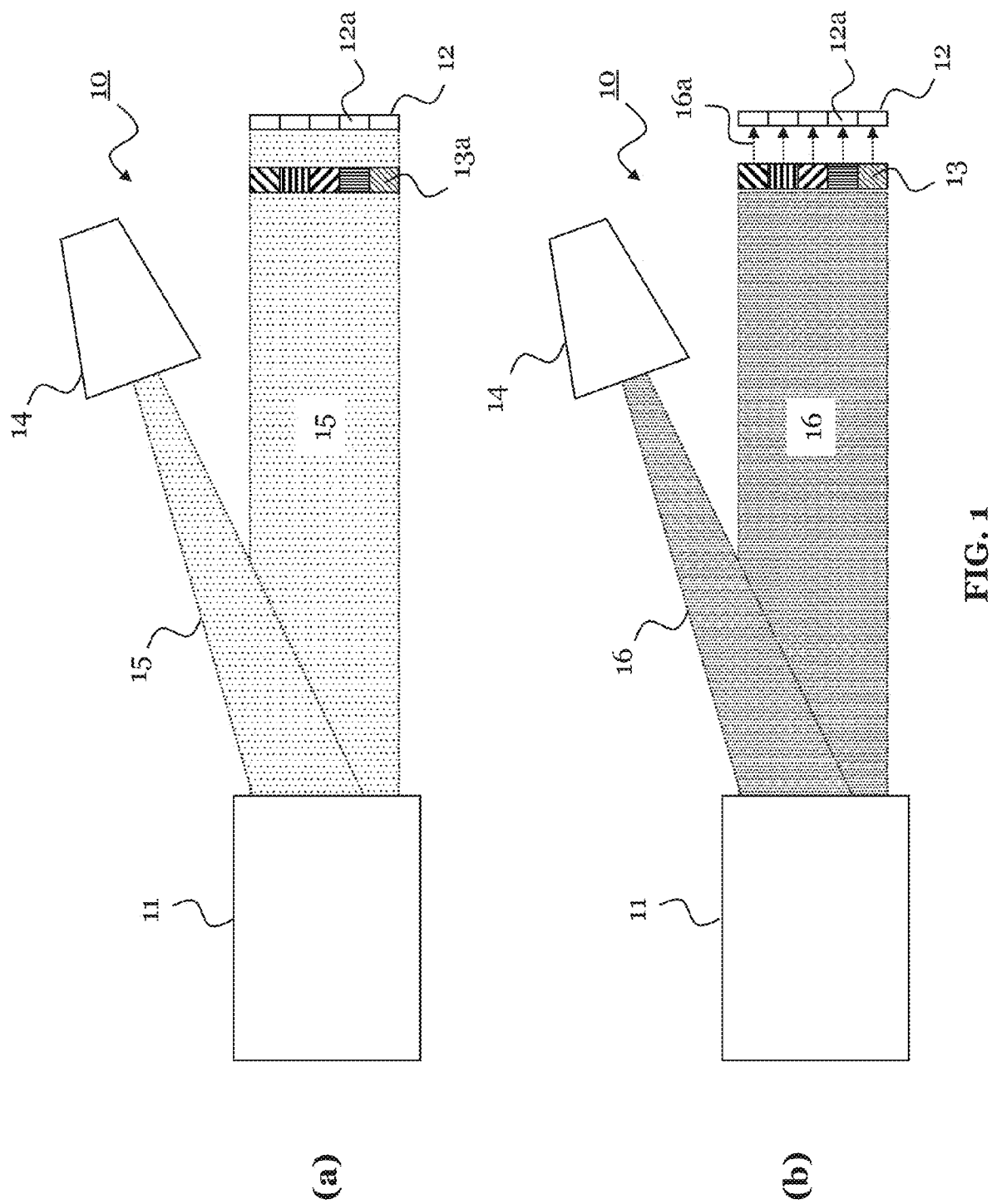
FIG. 1 shows a system according to an example embodiment.

FIG. 1 shows an HSI system 10 according to an embodiment of the present disclosure. The HSI system 10 is usable for imaging a scene 11. The scene 11 is only shown schematically in FIG. 1 and can differ depending on the application scenario. For instance, the scene 11 may be a human eye (in an ophthalmologic application scenario), a wound (in a medical application scenario), a region covered by a certain material (e.g. in an application scenario of food inspection), or may include one or more dispersed items, etc.

The HSI system 10 comprises a sensor 12, which may be a CMOS sensor. The sensor 12 has a plurality of sensor pixels 12a. Further, the HSI system 10 comprises a plurality of spectral filters 13a, which can be interference filters like Fabry-Pérot filters. The plurality of spectral filters 13a may form one or more filter banks of a spectral unit 13. Each of the spectral filters 13a is associated with one of the sensor pixels 12a. Accordingly, the sensor 12 may be an HSI sensor of an HSI camera.

The HSI system 10 also includes at least one illumination source 14. The at least one illumination source 14 is configured to illuminate the scene 11 at least with a first set of wavelengths 15, and with a second set of wavelengths 16. Each set of wavelengths 15 and 16 may thereby be produced by a different illumination source 14, or by the same illumination source 14. The scene 11 may be illuminated with the first set of wavelengths 15 and the second set of wavelengths 16 one after the other, or at the same time. FIG. 1 shows, for example, that in (a) the scene 11 is illuminated with the first set of wavelengths 15, and that in (b) the scene 11 is illuminated with the second set of wavelengths 16 by the same illumination source 14. Accordingly, in FIG. 1 the scene 11 is illuminated with one set of wavelengths at a time.

The two sets of wavelengths 15 and 16 are selected such that each spectral filter 13a is configured to pass the first set of wavelengths 15 to the sensor pixel 12a it is associated with, but to pass only a subset 16a of the second set of wavelengths 16 to the sensor pixel 12a it is associated with. For instance, the first set of wavelengths 15 may include common spectral-leak wavelengths of the spectral filters 13a, so that it is passed to each one of the sensor pixels 12a. The second set of wavelengths 16 may cover the spectral region where the filters 13a nominally work, i.e. each spectral filter 13a may be configured to pass a different subset 16a (e.g. narrowband) of the second set of wavelengths 16 to the sensor pixel 12a it is associated with, in order to provide the spectral information of the scene 11.

FIG. 2 shows a method 20 according to an example embodiment of the disclosure in a flow-diagram. The method 20 is usable for imaging the scene 11, and makes use of the HSI system 10 according to an example embodiment of the disclosure as shown in FIG. 1.

The method 20 accordingly comprises a first step 21 of obtaining a higher-resolution spatial image by illuminating the scene 11 with the first set of wavelengths 15, wherein each spectral filter 13a passes the first set of wavelengths 15 to the sensor pixel 12a it is associated with. This is shown schematically in FIG. 1(a). The higher-resolution spatial image may be obtained by using each of the sensor pixels 12a as a different pixel of the image.

In step 21, the illumination source 14 may be modified to emit only in the spectral leaks wavelengths, e.g. using narrowband LEDs or lasers. The scene 11 is then illuminated with the first set of wavelengths 15 and each single sensor pixel 12a can detect it. In this way, each sensor pixel 12a may act as a single image pixel and an image with the highest possible spatial resolution can be obtained.

The method 20 further comprises a second step 22 of obtaining a lower-resolution hyperspectral image by illuminating the scene 11 with the second set of wavelengths 16, wherein each spectral filter 13a passes only a subset 16a of the second set of wavelengths 16 to the sensor pixel 12a it is associated with. This is shown schematically in FIG. 1(b). The lower-resolution hyperspectral image may be obtained by using different groups of the sensor pixels 12a as different macro-pixels of the image.

In step 22, the illumination source 14 may be modified to emit only in the spectral region where the spectral filters 13a associated with the sensor pixels 12a allow the transmission of specific narrow spectral bands. The spectral information of the scene 11 may then be obtained from different macro-pixels formed by sensor pixel groups. The spatial resolution of the hyperspectral image is of course reduced with respect to the previously obtained image, because multiple sensor pixels are used together as a macro-pixel to get the spatial information of an image pixel. The spatial resolution of the hyperspectral image is determined by the number of macro-pixels.

Notably, as already mentioned above, the illumination source 14 may also be modified to emit at the same time the first set of wavelengths 15 and the second set of wavelengths 16. In this case, for example, a variable filter (or multiple different filters) may be used to make each set of wavelengths 15 and 16 reach the sensor 12 separately at a different time.

The spectrum of the illumination source 14 may be tuned in different ways. For instance, different filters may be placed in front of the illumination source 14, in order to block undesired spectral regions during step 21 and/or step 22 of the imaging process of method 20. The illumination source 14 can also include a collection of individual light sources, such as LEDs or lasers. Each individual light source may in this case provide a spectrum within a very well-defined spectral region. Different groups of light sources can be turned ON or OFF, depending on the required set of wavelengths 15 or 16.

Before obtaining the lower-resolution hyperspectral image, the obtained higher-resolution spatial image may be used to focus the HSI system 10 (HSI camera in the HSI system 10) on the scene 11 and/or align the HSI system 10 with respect to the scene 11 and/or identify an object in the scene 11. This can improve the hyperspectral image obtained at step 22. Accordingly, is possible to more accurately focus the scene 11, or to better align the HSI system 10, or to properly identify specific objects of interest in the scene 11.

The method 20 uses no rejection filters in front of the sensor pixels 12a of the HSI sensor 12, in particular no rejection filters that block wavelengths in the spectral leaks regions. In fact, it uses the spectral leaks to get the spatial information of the scene 11 with higher resolution. For this purpose, the illumination source 14 may be customized. Notably, one or more rejection filters can still be used on top of the spectral filters 13a, in order to eliminate the spectral contribution of higher interference orders (see e.g. FIG. 6), but their construction is simpler than the construction of rejection filters that also block the spectral-leak wavelengths. Such a rejection filter may be configured to block wavelengths corresponding to higher interference orders of the subsets 16a of the second set of wavelengths 16, which an associated spectral filter 13a is configured to pass.

Figure 6:
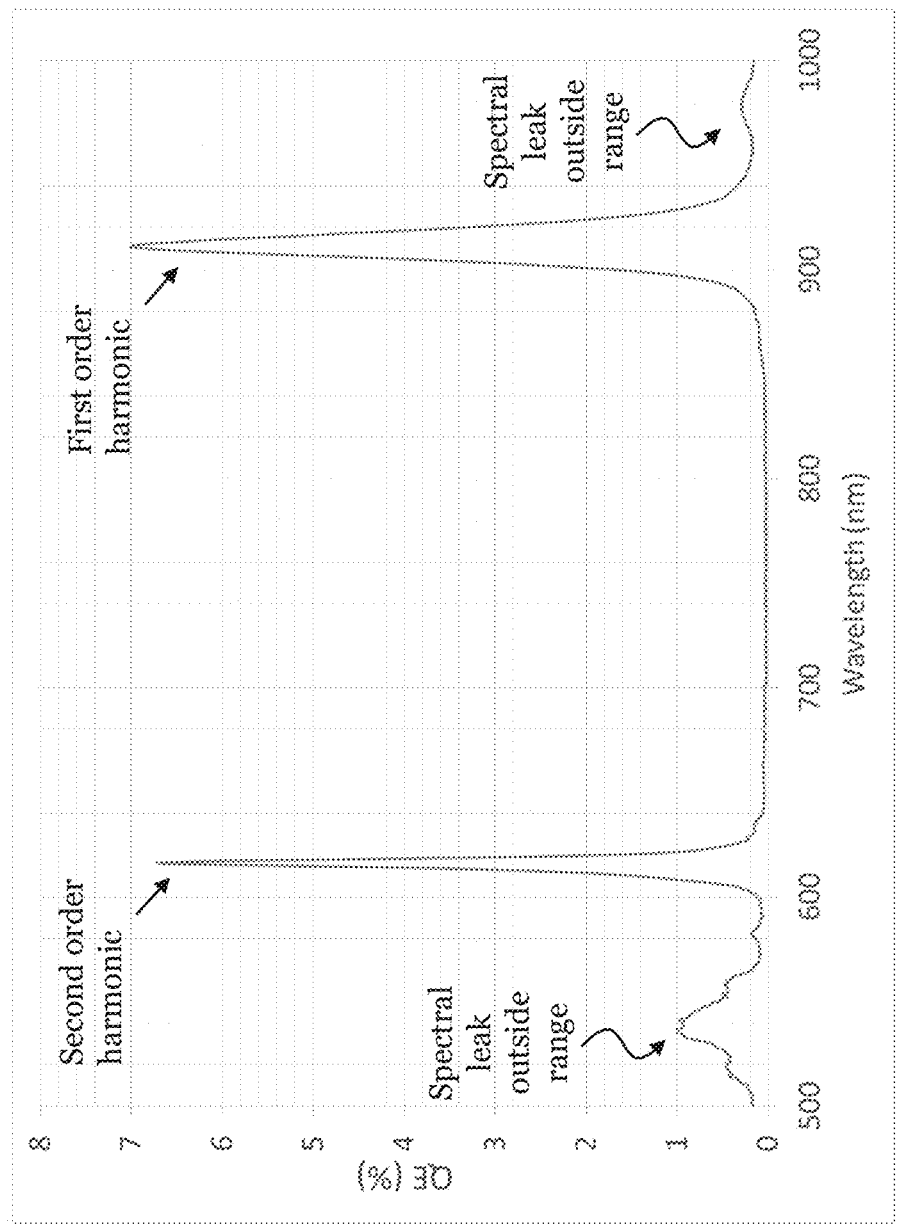
FIG. 6 shows a spectral response including main order harmonic and second order harmonic of a main transmission of an example interference filter.

In the spectral leaks region, QE of the filters 13a can be lower than at the main transmission of the filters 13a (see e.g. FIG. 6). However, this lower QE of the spectral leaks can be compensated for by using an illumination source 14 that covers the full broadband of the spectral leaks. That is, the first set of wavelengths 15 may cover the full broadband of the spectral leaks. Thus, the first set of wavelengths 15 may cover a broader wavelength range than the second set of wavelengths 16. If the low QE of the spectral leaks cannot be fully compensated for with such a broadband illumination, then a longer exposure time may be applied to obtain the high spatial resolution image. That is, a duration of illuminating with the first set of wavelengths 15 may be longer than a duration of illuminating with the second set of wavelengths 16.

The above embodiments are explained for a case, in which it may be assumed that the spectral filters 13a of the spectral unit 13 associated with the plurality of sensor pixels 12a all have common spectral-leak wavelengths. The plurality of sensors 12a may thereby be all the pixels 12a of the sensor 12. Different macro-pixels may be formed from the plurality of sensor pixels 12a, wherein each macro-pixel includes the same set of spectral filters 13a. In each of these macro-pixels, each spectral filter 13a can be configured to pass a different subset 16a of the second set of wavelengths 16, while all the spectral filters 13a of the macro-pixel have common spectral-leak wavelengths.

However, it is also possible that the plurality of sensor pixels 12a are only a subset (a fraction) of all sensor pixels 12a of the sensor 12, e.g. if the HSI sensor 12 is (logically) divided into different types of pixel blocks (e.g. arranged in a mosaic pattern) or different types of pixel columns (e.g. arranged in in a line pattern). In this case, the plurality of sensor pixels 12a may belong to one type of block or line, and the associated spectral filters 13a may be only one of several different filter banks of filter sets provided over the HSI sensor 12 (in a mosaic or column arrangement).

Figure 3:
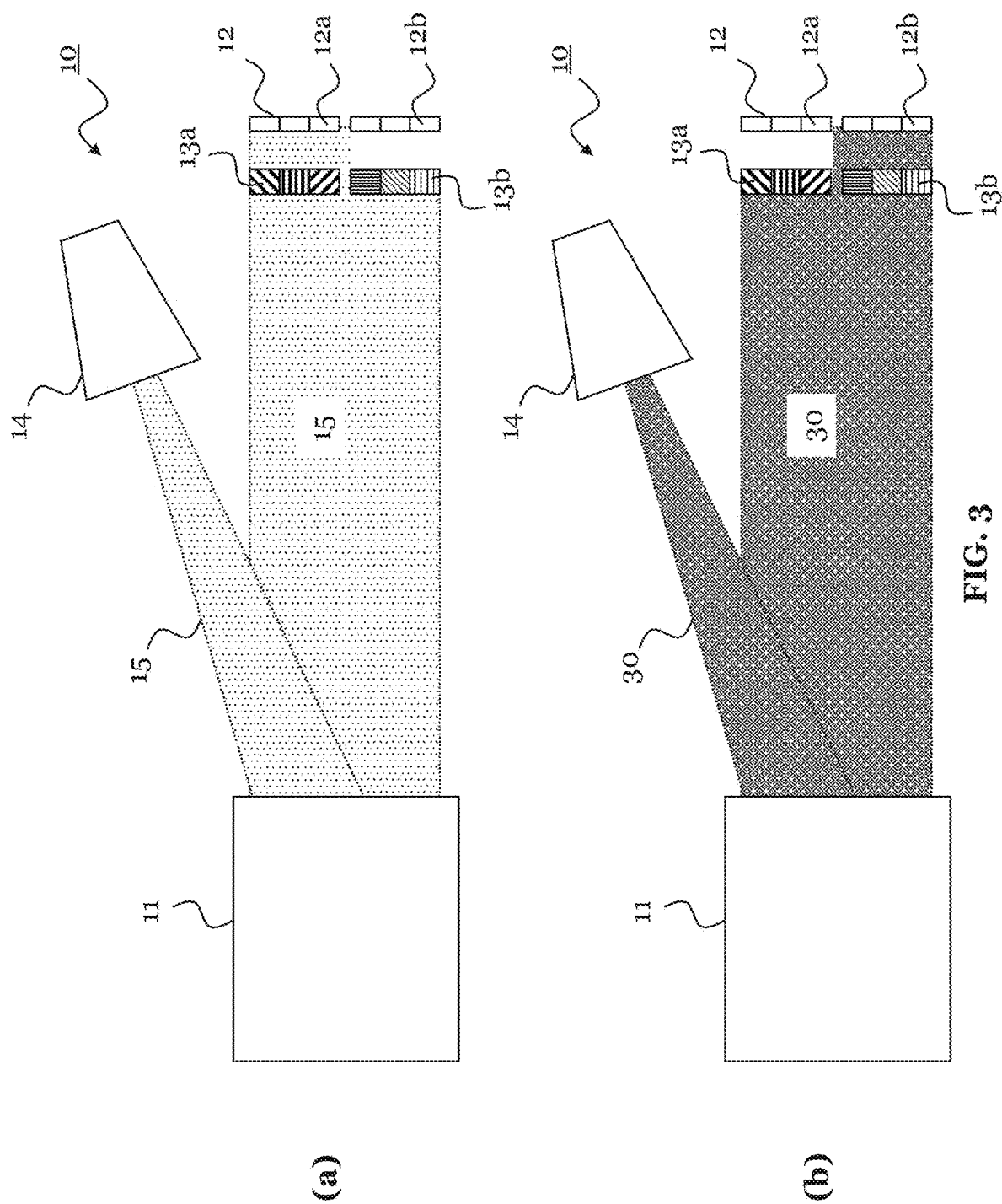
FIG. 3 shows a system according to an example embodiment.
Figure 4:
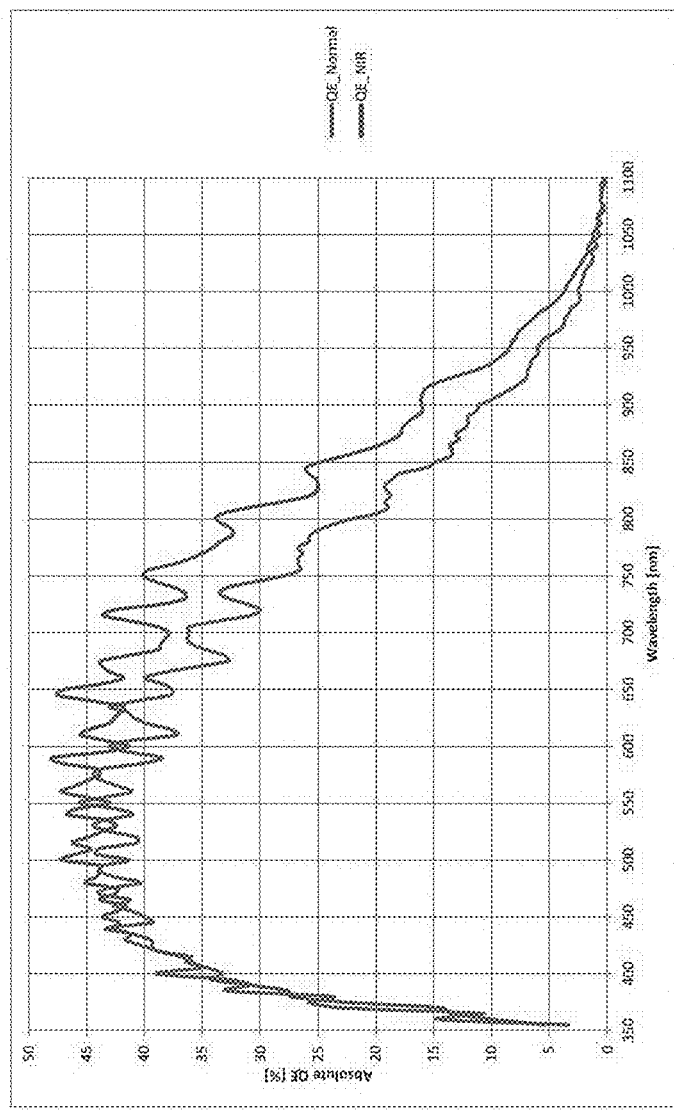
FIG. 4 shows a spectral response of an example CMOS sensor.
Figure 5:
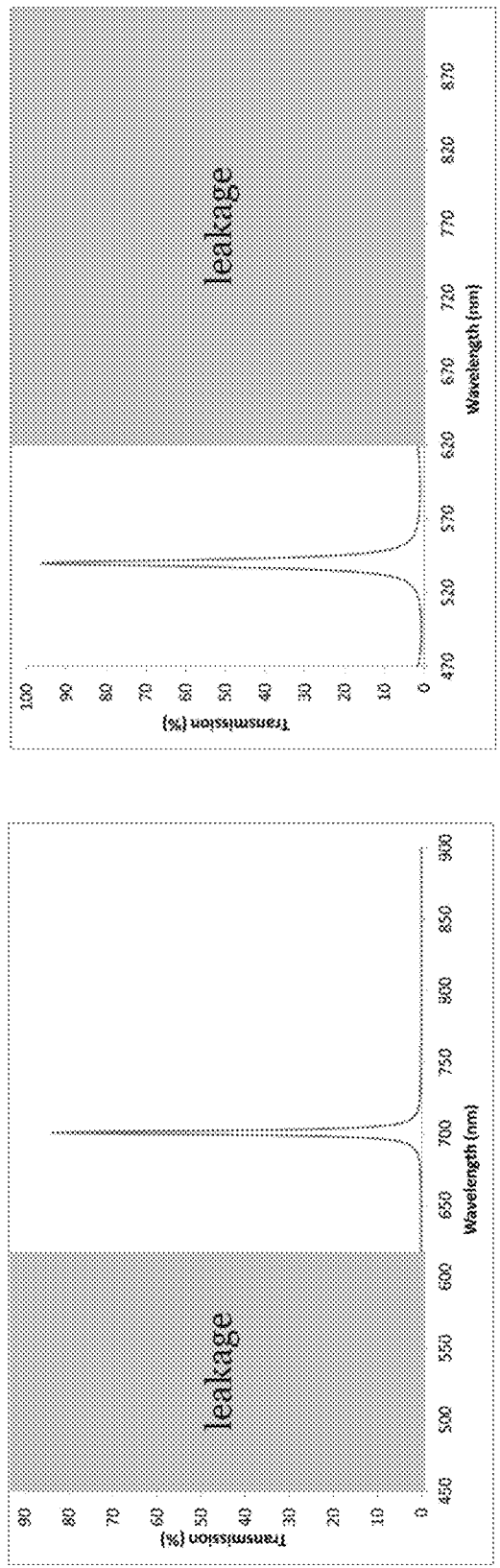
FIG. 5 shows a spectral response including main transmission and spectral leaks of different example interference filters.

As shown in FIG. 3, the sensor 12 may consequently also include a plurality of further sensor pixels 12b. In this case, there may also be a plurality of further spectral filters 13b, e.g. belonging to another filter bank, filter array or filter set than the plurality of filters 13a. Each of the further spectral filters 13b is associated with one of the further sensor pixels 12b. The further spectral filters 13b may have second common spectral-leak wavelengths (common out-of-band transmission region), which are different from first common spectral-leak wavelengths (common out-of-band transmission region) of the spectral filters 13a. Thus, different types of macro-pixels may be formed from the plurality of further sensor pixels 12b associated with the further spectral filters 13b, than are formed from the sensor pixels 12a associated with the spectral filters 13a.

FIG. 3 shows for this case an HSI system 10 according to an example embodiment of the present disclosure, which builds on the HSI system 10 shown in FIG. 1. Same elements share the same reference signs and function likewise. With the HSI system 10 of FIG. 3, a method 20 according to an example embodiment, which builds on the method 20 shown in FIG. 2, can be carried out.

Using the HSI system 10 shown in FIG. 3, the method 20 may include further an illumination with a third set of wavelengths 30, as shown in FIG. 3(b). In particular, the higher-resolution spatial image may be obtained by illuminating the scene 11 with the first set of wavelengths 15, as shown in FIG. 3(a), and illuminating the scene 11 with the third set of wavelengths 30, wherein each spectral filter 13a passes the first set of wavelengths 15 to the sensor pixel 12a it is associated with, and each further spectral filter 13b passes the third set of wavelengths 30 to the further sensor pixel 12b it is associated with. The illuminating of the scene 11 with the first set of wavelengths 15 may be done before, after, or at the same time as the illuminating of the scene 11 with the third set of wavelengths 30. The spectral filters 13a may block the third set of wavelengths 30. The further spectral filters 13b may block the first set of wavelengths 15.

Further, the lower-resolution hyperspectral image may be obtained as described previously by illuminating the scene 11 with the second set of wavelengths 16 (not shown, since it is very similar as in FIG. 1(b)). Thereby, each further spectral filter 13b passes only a subset 16a of the second set of wavelengths 16 to the further sensor pixel 12b it is associated with.

It is also possible to illuminate the scene 11 at the same time with more than one set of wavelengths, e.g. with all three sets of wavelengths 15, 16, 30 at the same time. Then, at least one filter, e.g. variable filter, should be applied to the sensor, in order to make at least the second set of wavelengths 16 reach the sensor at a different time than the first and third set of wavelengths 15, 30.

The above-described concept can of course be extended to more than two sets of wavelengths 15 and 30 in the first illuminating step 21, in case there are more than two different types of filter banks with spectral filters having different common spectral-leak wavelengths. Accordingly, in total the scene 11 may be also illuminated with more than the three sets of wavelengths 15, 30, and 16.

In summary, the method 20 and the HSI system 10 according to the above-described embodiments allow for obtaining a higher-resolution spatial image and also a lower-resolution hyperspectral image.

What is claimed is:

1. A method for imaging a scene with a hyperspectral imaging (HSI) system including a sensor with a plurality of sensor pixels and a plurality of spectral filters, each of the spectral filters being associated with one of the sensor pixels, wherein the method comprises:
   obtaining a spatial image having a first resolution by illuminating the scene with a first set of wavelengths, wherein each spectral filter passes the first set of wavelengths to the sensor pixel it is associated with; and
   obtaining a hyperspectral image having a second resolution that is lower than the first resolution by illuminating the scene with a second set of wavelengths different from the first set of wavelengths, wherein each spectral filter passes only a subset of the second set of wavelengths to the sensor pixel it is associated with.

2. The method according to claim 1, wherein:
   the first set of wavelengths includes common spectral-leak wavelengths of the spectral filters.

3. The method according to claim 1, wherein:
   each of the spectral filters passes a different subset of the second set of wavelengths to the sensor pixel it is associated with.

4. The method according to claim 1, further comprising:
   using the spatial image to (i) focus on the scene, (ii) align the HSI system with respect to the scene, or (iii) identify an object in the scene, before obtaining the hyperspectral image.

5. The method according to claim 1, wherein:
   the spatial image is obtained by using each of the sensor pixels as a different pixel of the image.

6. The method according to claim 1, wherein:
   the hyperspectral image is obtained by using different groups of the sensor pixels as different macro-pixels of the image.

7. The method according to claim 1, wherein:
   the first set of wavelengths includes near-infrared (NIR), ultraviolet (UV), or violet wavelengths.

8. The method according to claim 1, wherein:
   the first set of wavelengths includes more wavelengths than the second set of wavelengths or covers a broader wavelength range than the second set of wavelengths.

9. The method according to claim 1, wherein:
   a duration of the illuminating with the first set of wavelengths is longer than a duration of the illuminating with the second set of wavelengths.

10. The method according to claim 1, wherein the sensor includes a plurality of additional sensor pixels and the HSI system includes a plurality of additional spectral filters, each of the additional spectral filters being associated with one of the additional sensor pixels, wherein:

obtaining the spatial image by illuminating the scene with the first set of wavelengths further comprises illuminating the scene with a third set of wavelengths different from the first and second sets of wavelengths, wherein each additional spectral filter passes the third set of wavelengths to the additional sensor pixel it is associated with, and when obtaining the hyperspectral image by illuminating the scene with the second set of wavelengths, each additional spectral filter passes only a subset of the second set of wavelengths to the additional sensor pixel it is associated with.

11. A hyperspectral imaging (HSI) system for imaging a scene, the HSI system comprising:
   a sensor including a plurality of sensor pixels;
   a plurality of spectral filters, each of the spectral filters being associated with one of the sensor pixels; and
   an illumination source configured to illuminate the scene at least with a first set of wavelengths and with a second set of wavelengths different from the first set of wavelengths,
   wherein each spectral filter is configured to (i) pass the first set of wavelengths to the sensor pixel it is associated with and (ii) pass only a subset of the second set of wavelengths to the sensor pixel it is associated with, and
   wherein the HSI system is configured to:
      obtain a spatial image of the scene by illuminating the scene with the first set of wavelengths and capturing the spatial image using each of the sensor pixels as a different pixel of the image, wherein the spatial image has a first resolution; and
      obtain a hyperspectral image of the scene by illuminating the scene with the second set of wavelengths and capturing the hyperspectral image using different groups of the sensor pixels as different macro-pixels of the image, wherein the hyperspectral image has a second resolution that is lower than the first resolution.

12. The HSI system according to claim 11, wherein the HSI system is configured to:
   use the spatial image to (i) focus on the scene, (ii) align the HSI system with respect to the scene, or (iii) identify an object in the scene, before obtaining the hyperspectral image.

13. The HSI system according to claim 11, further comprising:
   one or more rejection filters, each rejection filter being associated with one or more of the spectral filters,
   wherein each rejection filter is configured to block wavelengths corresponding to higher interference orders of the subsets of the second set of wavelengths, which the spectral filters it is associated with are configured to pass.

14. The HSI system according to claim 11, wherein:
   the illumination source includes a plurality of filters and is configured to (i) produce the first set of wavelengths using at least a first filter of the plurality of filters and (ii) produce the second set of wavelengths using at least a second filter of the plurality of filters.

15. The HSI system according to claim 11, wherein:
   the illumination source includes (i) one or more first light sources configured to produce the first set of wavelengths and (ii) one or more second light sources configured to produce the second set of wavelengths.

16. The HSI system according to claim 11, wherein:
   the illumination source is configured to concurrently illuminate the scene with the first set of wavelengths and the second set of wavelengths, and
   the HSI system further includes at least one filter configured to separately pass the first set of wavelengths to the sensor before or after passing the second set of wavelengths to the sensor.

17. The HSI system according to claim 11, wherein:
   the first set of wavelengths includes common spectral-leak wavelengths of the spectral filters.

18. The HSI system according to claim 11, wherein:
   the first set of wavelengths includes more wavelengths than the second set of wavelengths or covers a broader wavelength range than the second set of wavelengths.

19. The HSI system according to claim 11, wherein:
   each of the spectral filters is configured to pass a different subset of the second set of wavelengths to the sensor pixel it is associated with.

* * * * *